United States Patent [19]

Yamamori et al.

[11] Patent Number: 5,025,592

[45] Date of Patent: Jun. 25, 1991

[54] MACHINE TOOL HAVING WORKPIECE MACHINING DIMENSION AND TOOL LENGTH MEASURING FUNCTIONS

[75] Inventors: Masayoshi Yamamori, Kasugai; Yoshihiko Nakashima, Nagoya, both of Japan

[73] Assignee: Brother Kogyo Kabushiki Kaisha, Aichi, Japan

[21] Appl. No.: 346,547

[22] Filed: May 2, 1989

[30] Foreign Application Priority Data

May 9, 1988 [JP] Japan .................................. 63-112232
Jan. 24, 1989 [JP] Japan .................................... 1-14917

[51] Int. Cl.$^5$ ............................................. B24B 49/02
[52] U.S. Cl. .............................. 51/165.71; 51/165.75; 51/165.9; 51/165.87; 51/5 D; 125/11.01
[58] Field of Search ............... 51/5 D, 165.71, 165.74, 51/165.75, 165.76, 165.77, 165.9, 165.91, 165.87, 165.88; 125/11 R, 11 H

[56] References Cited

U.S. PATENT DOCUMENTS

| | | | |
|---|---|---|---|
| 4,461,125 | 7/1984 | Wuest | 51/165.77 |
| 4,571,891 | 2/1986 | Domer | 51/165.88 |
| 4,897,964 | 2/1990 | Vetter | 51/5 D |

FOREIGN PATENT DOCUMENTS 54-55277 5/1979 Japan .
57-27645 2/1982 Japan .
61-53188 11/1986 Japan .

*Primary Examiner*—Frederick R. Schmidt
*Assistant Examiner*—M. Rachuba
*Attorney, Agent, or Firm*—Oliff & Berridge

[57] ABSTRACT

A numerically controlled machine tool, such as a grinding machine, is capable of machining a workpiece with a precise dimension by measuring a workpiece machining dimension and/or a tool length. According to one aspect of the invention, when the machining operation is provisionally terminated, a machining dimension of the workpiece is measured without dismounting the workpiece from a table. If a machining error is detected, the workpiece is further machined to a target dimension to thus eliminate the machining error. According to another aspect of the invention, the grinding surface of a grinder is subjected to dressing or truing, and the length of the grinder reduced through the dressing or truing is detected to determine the actual length of the grinder. With the known length of the grinder, the feeding amount of the grinder with respect to the workpiece is set for the subsequent machining operation.

5 Claims, 8 Drawing Sheets

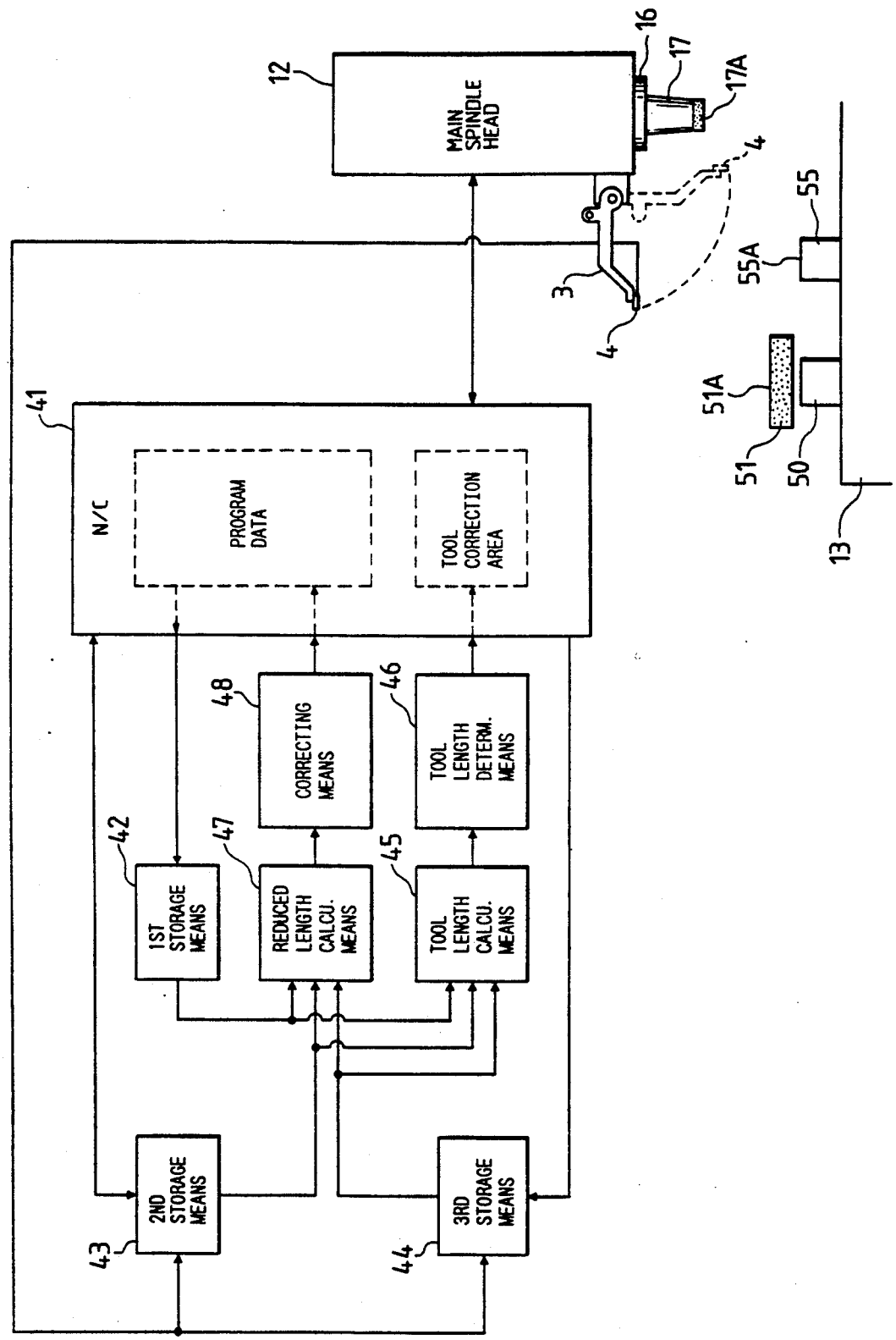

MACHINE TOOL HAVING WORKPIECE MACHINING DIMENSION AND TOOL LENGTH MEASURING FUNCTIONS

BACKGROUND OF THE INVENTION

The present invention relates generally to a numerically controlled machine tool, such as grinder. More particularly, the invention relates to such a machine tool having a function of correcting a machining dimension of a workpiece and/or a function of setting a tool length after truing or dressing has been performed.

Conventionally, a machine tool equipped with a numerical control (referred to "NC") apparatus has been so designed as to correct machining dimension of a workpiece by changing or setting a tool correction value. In the case where the correction value is determined in accordance with only tool dimension measured by a tool presetter, such conventional machine tool cannot correct other factors such as deformation or displacement of components and tools thereof owing to thermal stress or abrasion of tools. Therefore, when such conventional machine tool is used for high precision machining, it is necessary to correct the tool correction value by actually measuring a dimension of the workpiece after being worked by the machine tool.

In the conventional NC type machine tool, the workpiece should be dimensioned from the machine tool to measure the dimension of the workpiece.

Another conventional machine tool equipped with an automatic tool changer (ATC) such as machining center has been provided with a measuring device assembled on a tool holder as one of the tools. In such machine tool, the dimension of the workpiece is measured by the measuring device which is mounted on a main spindle in the same manner as oridinary tool exchanger.

The former type machine tool, however, may cause a problem that a relatively long working time is required to measure the workpiece after dismounting it from the machine tool and a skilled operator is also required to precisely correct the tool correction value in accordance with the measured data.

The latter type machine tool with ATC must temporarily replace its working tool with the measuring tool to measure the dimension of the workpiece, thereby resulting in time-loss. Although the working tool is remounted on the machine tool after measurement, mounting state such as mounting angle and alignment of the working tool with the main spindle cannot be completely identified with the former mounting state before measurement. This may cause another problem that the measured data is not directly reflected in the tool correction value.

On the other hand, the conventional machine tool equipped with an NC device has been operated according to a processing program which is arranged with use of a correction of tool length in order to adapt the machine tool for general purpose. In a grinding machine, it is necessary to perform truing or dressing for its grinding tool in order to restore the tool to its original shape and sharpness. After truing or dressing, the tool length is measured and then the tool correction value is corrected.

In prior arts, the grinding tool should be dismounted from a main spindle to measure the tool length by a tool presetter and then to correct the tool correction value in response to the measured tool length.

On the other way, the grinding tool mounted on the main spindle, without dismounting from the machine tool, has been brought into contact with a reference block of which dimension is previously measured to measure the tool dimension and the measurement value is set into the program. Further, the grinding tool has been brought into contact with a touch switch stationarily arranged in stead of the reference block to automatically measure the tool dimension.

The first type grinding machine, however, may cause a problem that a relatively long working time is required to measure the grinding tool after dismounting it from the main spindle. Further mounting state such as mounting angle and alignment of the grinding tool on the main spindle can not be completely identified with the mounting state before measurement. This may cause another problem that the measured data is not directly reflected to the correction value.

The second type grinding machine with the reference block should be carried out with manual operation to measure the tool length, thereby resulting in time-loss and demanding a skilled operator.

Further, the third type grinding machine with the touch sensor stationarily mounted on the machine cannot measure the changed (reduced) amount of the grinder for truing or dressing which is ground with the grinding tool.

The above three conventional machines cause a common problem that the program data for truing or dressing has to be corrected whenever the truing or the dressing is carried out, therefore time-loss is caused.

SUMMARY OF THE INVENTION

The present invention has been made to eliminate the above-noted problems, and it is an object of the invention to provide a numerically controlled machine tool capable of machining a workpiece to a traget dimension by measuring the dimension of a machining workpiece and correcting a machining dimension of the tool.

Another object of the present invention is to provide a machining dimension measuring device capable of measuring the dimension of the workpiece.

Still another object of the present invention is to provide a grinding machine for grinding the surface of a workpiece, where the length of a grinding tool after the latter is subjected to truing or dressing is measured to thus perform the machining operation with the corrected length of the grinding tool, in which case there is no need to change the mounting condition of the grinding tool on a main spindle.

Yet another object of the present invention is to provide a grinding machine in which a reduced amount of a truing or dressing grinder caused by the truing or dressing is measured and a truing or dressing program for an NC apparatus is automatically corrected in accordance with a value thus measured. A machining cycle comprising dressing or truing and grinding can be repeatedly performed.

In order to achieve the above and other objects, according to a first aspect of the present invention, there is provided as shown in FIG. 1, a machine tool for machining a workpiece with a tool (9), comprising:

a numerical control apparatus (1) having a function to control a relative movement of the tool (9) with respect to the workpiece, the tool (9) being mounted on a main spindle, the main spindle being rotatably mounted on a main spindle head;

a machining dimension measuring device (3) attached to the main spindle head for measuring a machining dimension of the workpiece, said measuring device including a contact sensor (4) for sensing a position and outputting a position signal representative of the sensed position;

a first storage means (5) for storing a first position signal outputted from said contact sensor (4) when said contact sensor (4) contact a machining surface of the workpiece provisionally machined by the tool (9);

a second storage means (6) for storing a second position signal outputted from said contact sensor (4) when said contact sensor (4) contacts a reference plane;

a machining error calculating means (7) for calculating a machining error based upon a difference between the machining surface and the reference plane in accordance with the first position signal stored in said first storage means (5) and the second position signal stored in said second storage means (6), said calculating means (7) outputting an error signal;

an error correcting means (8) for producing an error correction signal in response to the error signal; and wherein said numerical control apparatus (1) controls the relative movement of the tool (9) with respect to the workpiece in response to the error correction signal to thus finishingly machine the workpiece to have substantially no machining error.

In the machine tool thus arranged, when the machining operation for the workpiece is provisionally terminated, both the machining tool and the workpiece are left as they are, and the positions or heights of the machining surface of the workpiece and the reference plane are measured by the contact sensor to thus detect the machining error based upon a difference between the actually machined dimension and the target machining dimension. Based upon the machining error thus obtained, the tool correction value is renewed, and the workpiece is again machined in accordance with the renewal data of the tool correction value. Accordingly, the workpiece is finally machined while eliminating all the error factors including the error of the tool length.

According to a second aspect of the invention, there is provided as shown in FIGS. 3A and 3B a machining dimension measuring device (3) for use in a machine tool wherein a workpiece is machined with a tool attached to a main spindle (16), said main spindle (16) being rotatably mounted on a main spindle head (12), said device comprising:

a bell crank (23) pivotally movably supported on one side of the main spindle head (12), said bell crank (23) having a first arm (23A) and a second arm (23B);

a contact sensor (4) fixedly secured to the first arm (23A) for sensing a position and outputting a position signal representative of the sensed position; and an actuator (26) coupled between said second arm (23B) and said main spindle (16) for actuating said bell crank (23) to pivotally move said contact sensor (4) between a first position and a second position wherein said contact sensor (4) is capable of sensing the position when moved to the first position and is incapable of sensing the position when moved to the second position.

According to a third aspect of the invention, there is provided, as shown in FIG. 2, a grinding machine for grinding a workpiece with a grinding tool (17) mounted on a main spindle (16), the main spindle (16) being rotatably mounted on a main spindle head (12), comprising:

a numerical control apparatus (41) having a function to determine a length of the grinding tool (17), said numerical control apparatus having a dressing or truing program;

a dressing/truing means (50, 51) having a dressing or a truing surface (51) for dressing or truing the grinding tool (17) mounted on the main spindle head (12);

a tool length measuring device (43) for measuring the length of the grinding tool (17), said measuring device (43) including a contact sensor (4) for sensing a position and outputting a position signal representative of the sensed position;

a first storage means (42) for storing a first position data representative of the position of the main spindle (16) at the time when the dressing or truing by said dressing/truing means (50, 51) is terminated;

a second storage means (43) for storing a second position data representative for a second position outputted from said contact sensor (4) when said contact sensor (4) contacts the dressing surface (51A) of said dressing/truing means (50, 51) through a relative movement of said contact sensor (4) with respect to said dressing/truing means (50, 51);

a third storage means (44) for storing a third position data representative of a third position outputted from said contact sensor (4) when said contact sensor (4) contacts a reference plane through a relative movement of said contact sensor (4) with respect to the reference plane;

a tool length calculating means (45) for calculating the length of the grinding tool (17) in accordance with the first position data, the second position data, and the third position data, said calculating means (45) outputting a calculating data representative of the calculated length of the grinding tool (17); and a tool length determining means (46) for determining the length of the grinding tool (17) in accordance with the calculated data and providing a tool length data, said tool length data being applied to said numerical control apparatus.

The grinding machine further comprises:

a reduced length calculating means (47) responsive to the first, second and third position data for calculating a reduced length of said grinding tool (17) through the dressing or truing of said grinding tool (17); and a dressing/truing data correcting means (48) for correcting the dressing or truing program in said numerical control apparatus (41) in accordance with the calculated reduced length to set the dressing or truing amount to a predetermined value.

In the grinding machine thus arranged, after the dressing or truing of the grinding tool mounted on the main spindle, the length of the grinding tool or a cut depth of the grinding tool is measured by the tool length measuring device and the length thus measured is stored in the first storage means. Then, the second position or height of the dressing surface and the third position or height of the reference plane are detected by the contact sensor. From the values thus obtained, the length of the grinding tool is calculated and the length data is stored in a tool correction area. The subsequent grinding operations are performed based upon the data stored therein. During the above procedure, it is not necessary to demount the grinding tool from the main spindle.

BRIEF DESCRIPTION OF THE DRAWINGS

The present invention will be further described by way of non-limitative Example with reference to the accompanying drawings, in which:

FIG. 2 is a block diagram for description of an inventive concept in accordance with a second aspect of the present invention;

DETAILED DESCRIPTION OF THE PREFERRED EMBODIMENTS

Figure 1:
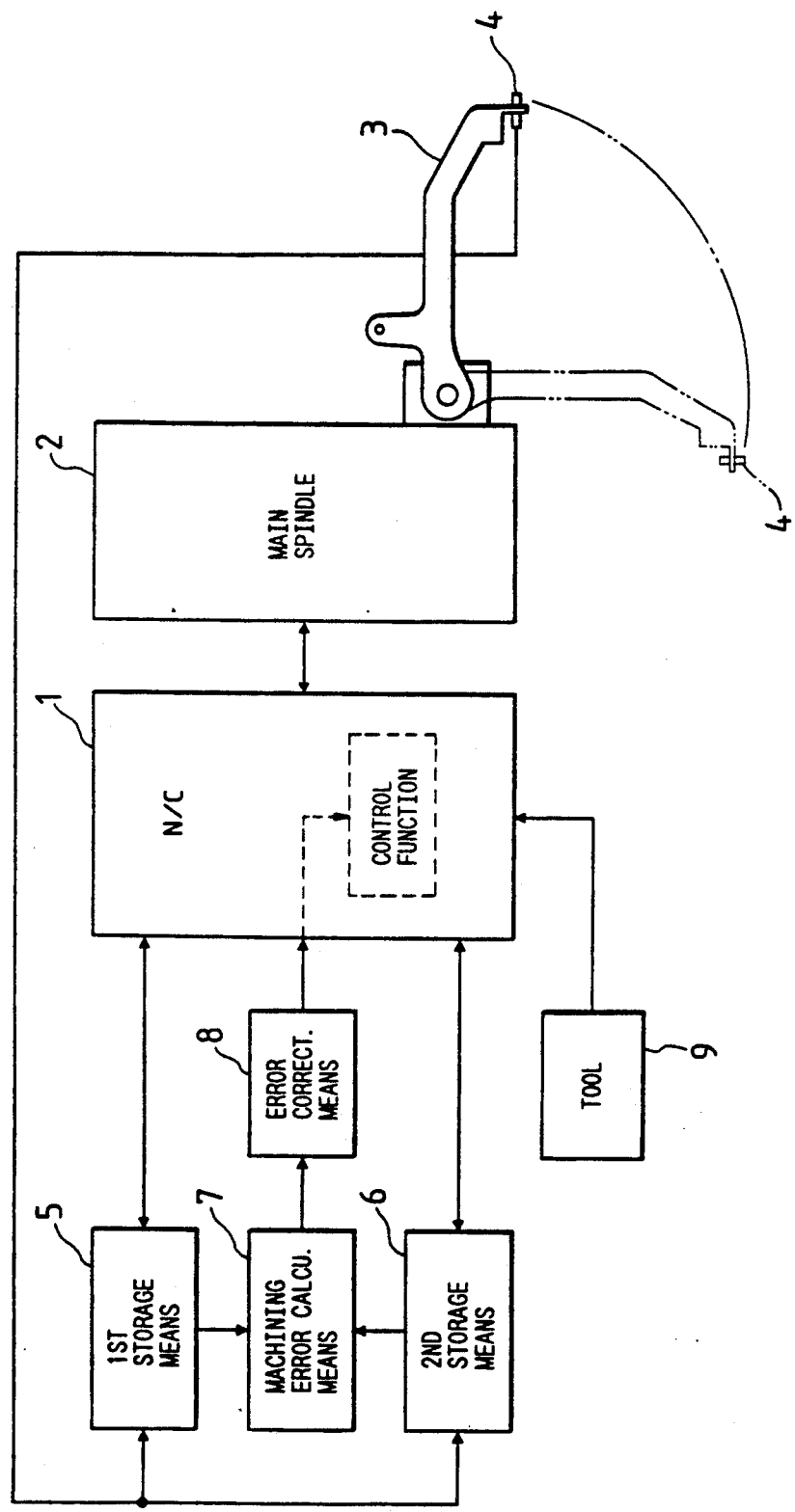
FIG. 1 is a block diagram for description of an inventive concept in accordance with a first aspect of the present invention.
Figure 3A:
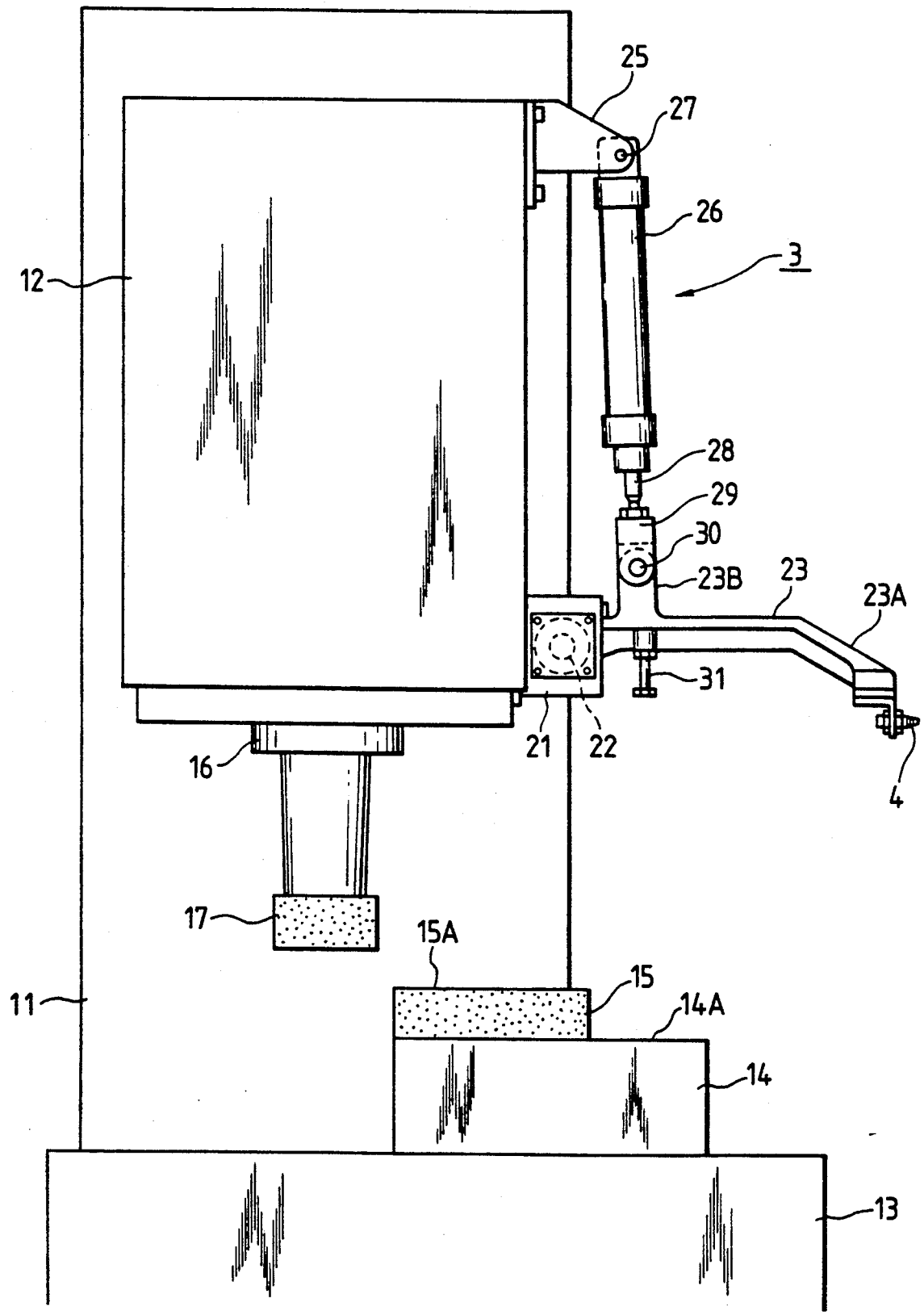
FIGS. 3A and 3B are elevational cross-sectional views showing a grinding machine according to a first embodiment of the present invention.
Figure 3B:
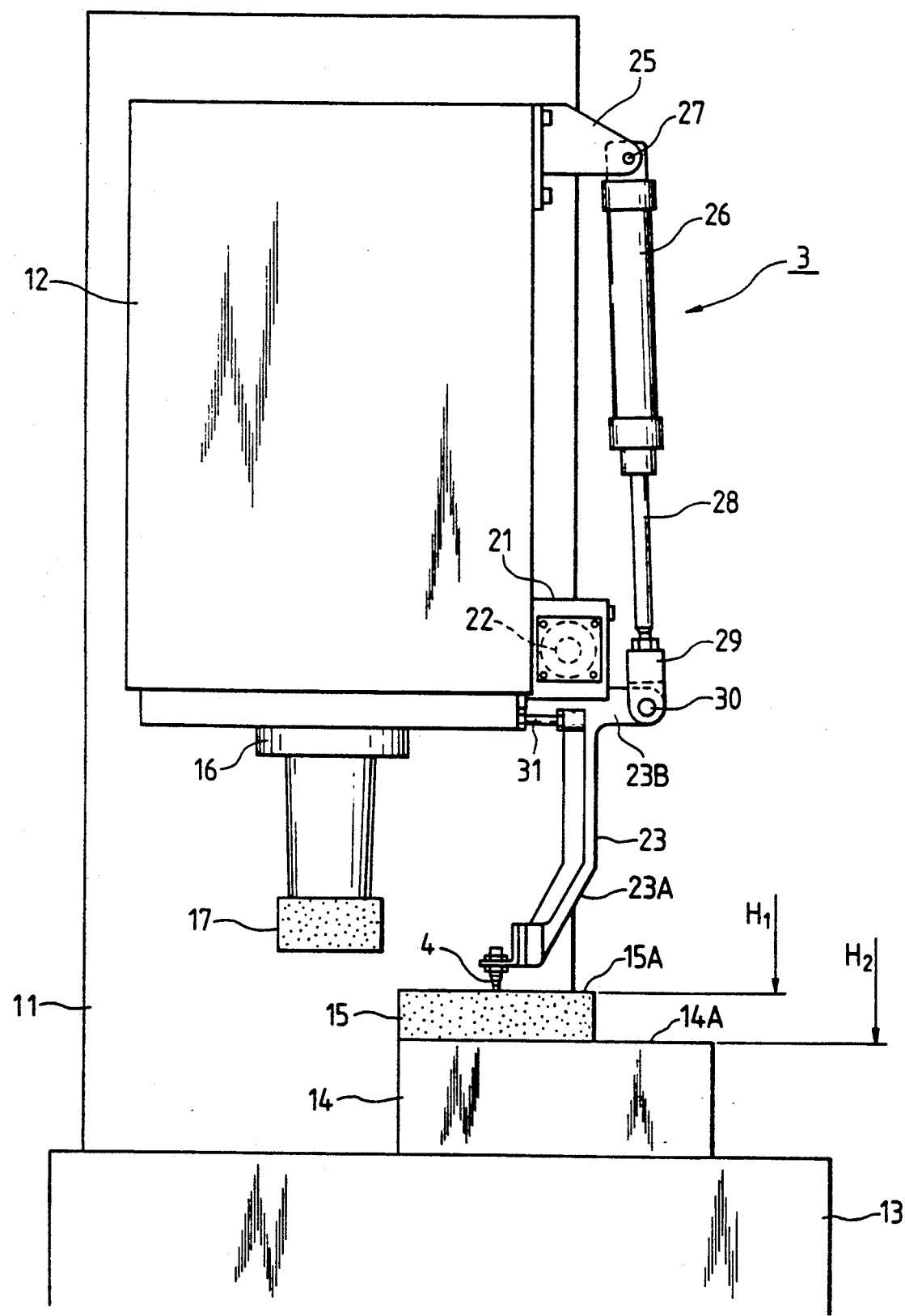
Figure 6:
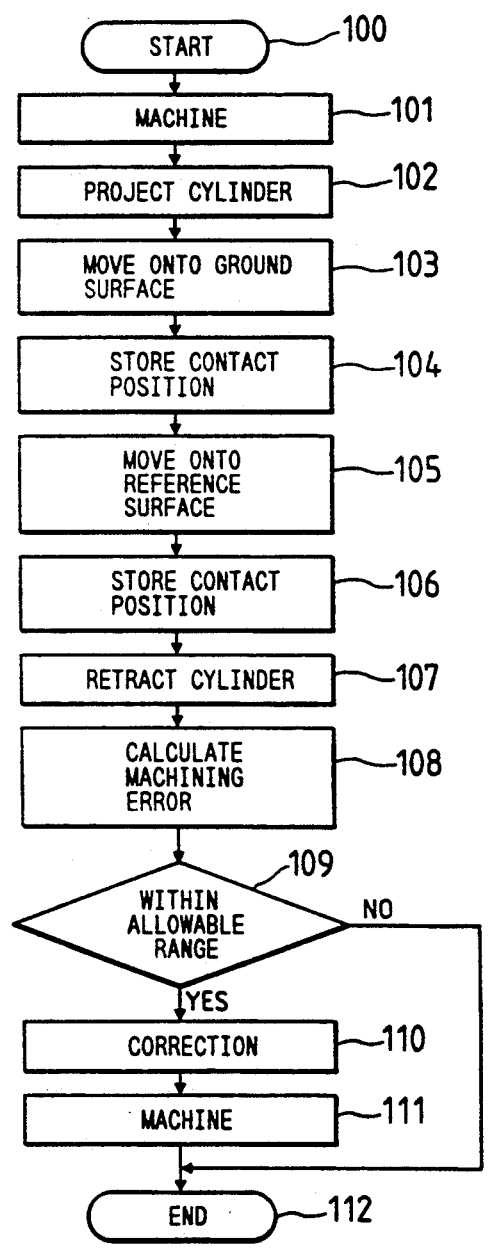
FIG. 6 is a flowchart for description of the processings performed by a machine tool according to the first embodiment of the present invention.

A first embodiment of the present invention will be described with reference to FIGS. 3A, 3B and 6. FIGS. 3A and 3B are elevational cross-sectional view showing one example of a grinder to which the present invention is applied.

A stationary column 11 is provided with a main spindle head 12 which is reciprocally movable in the vertical direction along the column 11. A table 13 is movable in the right-and-left direction and the fore-and-aft direction. The main spindle head 12 and the table 13 are driven by feed motors (not shown), and their positions are controlled by an NC device 1 independently of each other. A jig 14 is fixedly mounted on the table 13 on which a workpiece 15 made of, for example, ceramics is fixedly mounted. A main spindle 16 is rotatably mounted on the main spindle head 12 and a tool 17 such as a grinding wheel is attached to the main spindle 16. The workpiece 15 is ground by the tool 17 as the tool 17 is rotated by the main spindle 16.

A machined dimension measuring device 3 is provided on one side of the main spindle head 12 through a box shape bracket 21 fixed on the lower side position of the main spindle head 12. A ball-and-roller bearing 22 is provided in the bracket 21, a bell crank 23 is pivotally swingably supported by the bearing 22. The bell crank 23 has a long arm 23A whose end is provided with a contact sensor 4. As the contact sensor 4, a high precision switch which has an excellent precision is used in terms of repetitive use. Another bracket 25 is attached to the upper side portion of the main spindle head 12. The bell crank 23 also has a short arm 23B whose end is connected to one end of a pneumatic cylinder 26. The other end of the pneumatic cylinder 26 is pivotally movably supported on the bracket 25 through a connecting shaft 27. The pneumatic cylinder 26 includes a piston rod 28 having one end fixed to a joint 29. the joint 29 includes a shaft 30 through which the piston rod 28 is pivotally movably coupled to the short arm 23B. The pneumatic cylinder 26 functions as an actuator for swingably moving the bell crank 23.

The bell crank 23 is further provided with a stopper 31 which extends from the angle portion of the bell crank 23 where the short arm 23B and the long arm 23A merges. When the piston rod 28 of the pneumatic cylinder 26 projects downwardly and reached to the lower dead point, the stopper 31 is brought into contact with the side surface of the main spindle head 12 as shown in FIG. 3B. Thus, the swinging motion of the bell crank 23 is limited by the combination of the stopper 31 and the pneumatic cylinder 26 and hence the bell crank 23 is kept stationary. In this condition, the contact sensor 4 is allowed to contact the workpiece 15 to measure the height thereof. On the other hand, when the piston rod 28 of the pneumatic cylinder 26 is retracted or withdrawn, the bell crank 23 returns to the rest position where the long arm 26A is directed rightwardly as shown in FIG. 3A.

At the measuring position, the bell crank 23 is kept stationary owing to the urging force of the pneumatic cylinder 26 whereupon the stopper 31 is brought into contact with the main spindle head 12. Even if the rotational axis of the bell-and-roller bearing 22 is loosely moved within several microns, the bell crank 23 is kept stationary due to the stopper 31 and thus the measuring position of the contact sensor 4 is also kept at a fixed position. The machined dimension measuring device 3 is advantageous in that one pneumatic cylinder 26 serves as an actuator for moving the contact sensor 4 and a fixing means for fixing the contact sensor 4 at the measuring position.

In this embodiment, a top surface 15A of the workpiece 15 is ground to make its height into a target dimension. To this end, grinding work, measuring work, and correction grinding work are sequentially carried out in the stated order. Those works are carried out under the aegis of a computer incorporated in the NC apparatus. A program for operating the computer to this effect is shown by way of a flowchart in FIG. 6.

Upon starting the processing in step 100, a machining operation (grinding work) for the workpiece is carried out in accordance with a given NC machining program. In this stage, the pneumatic cylinder 26 has not yet been actuated and thus the contact sensor 4 is in the rest position. After the machining operating has terminated, the program advances to step 102 where the main spindle head 12 is elevated and then the cylinder rod 28 of the pneumatic cylinder 26 projects to pivotally move the bell crank 23 to the measuring position. In step 103, the table 13 is moved to an appropriate position and the main spindle head 12 is gradually descended until the contact sensor 4 is brought into contact with the machined surface 15A of the workpiece 15 whereupon the contact sensor 4 outputs a contact indicative signal. In step 104, a first position of the main spindle head 12 at the time when the contact sensor 4 outputs the contact indicative signal is stored as position information H1.

In step 105, the main spindle head 12 is again elevated to make the contact sensor 4 apart from the workpiece 15, and the table 13 is slidingly moved in the horizontal direction. Subsequently, the main spindle head 12 is descended to bring the contact sensor 4 into contact with a machining reference surface 14A of the jig 14. In step 106, a second position of the main spindle head 12 at the time when the contact sensor 4 outputs the contact indicative signal is stored as position information H2.

In step 107, the main spindle head 12 is elevated and the cylinder rod 28 of the pneumatic cylinder 26 is retracted to thereby return the bell crank 23 into its rest position.

In step 108, the machined dimension of the workpiece 15 is calculated in accordance with the position informations H1 and H2 representative of the first and second positions of the main spindle head to obtain a machining error between the actually machined dimension and the target dimension. In step 109, the error thus obtained is checked whether or not it is outside an allowable range. If no, i.e. when the error is within the allowable range, the program advances to step 112 to thereby end the program. On the other hand, when yes, i.e. when the error is greater than the allowable range, the program advances to step 110. In step 110, the tool correction value which has been stored in advance in the NC apparatus 1 is corrected in proportion to the error for correcting the machined error. In step 111, the workpiece 15 is again subjected to a second machining (grinding) operation which is controller by the corrected tool correction value. Thereafter, the series of the machining processings 100 ends in step 112.

As given description above, the machine tool according to the present invention can measure the machined dimension of the workpiece 15 after the first machining operation is performed without removing the workpiece 15 and detaching the tool 17 from the machine tool, and the subsequent machining operation with respect to the same workpiece 15 is performed with the corrected tool correction value if the error is present. Since the corrected tool correction value covers various factors, such as thermal deformation and tool abrasion which may cause a machining error, the machine tool ensures a high precision machining. Further, the sequence of the processings as described is automatically executed so that the machining operation is finished within a short period of time and with a high machining efficiency.

In this embodiment, a high precision switch is employed for the contact sensor 4 which can mechanically sense the height of the machined surface 15A of the workpiece 15, therefore, the machine tool according to the present invention can be easily applied to various workpiece 15 made of non-iron material such as ceramics, and can be produced at a low cost.

Although in the above embodiment, description has been made with respect to the case where the height of the workpiece 15 is corrected, the widthwise dimension of the workpiece 15 can also be corrected by providing a plurality of contact sensors at the tip end of the long arm 23 to thereby detect widthwise dimension thereof.

As described, according to the first embodiment, various excellent effects can be obtained such that the machine tool can perform precise machining operations while correcting various error factors such as thermal deformation or tool abrasion.

Further, since the movement of the contact sensor and fixing of the same are achieved by a single actuator, the machined dimension measuring device can be assembled with a simple structure and at a low low cost. In addition, the machined dimension measuring device can easily be installed to existing machine tools. Therefore, the existing machine tools can be rebuilt through a simple procedure.

Figure 4A:
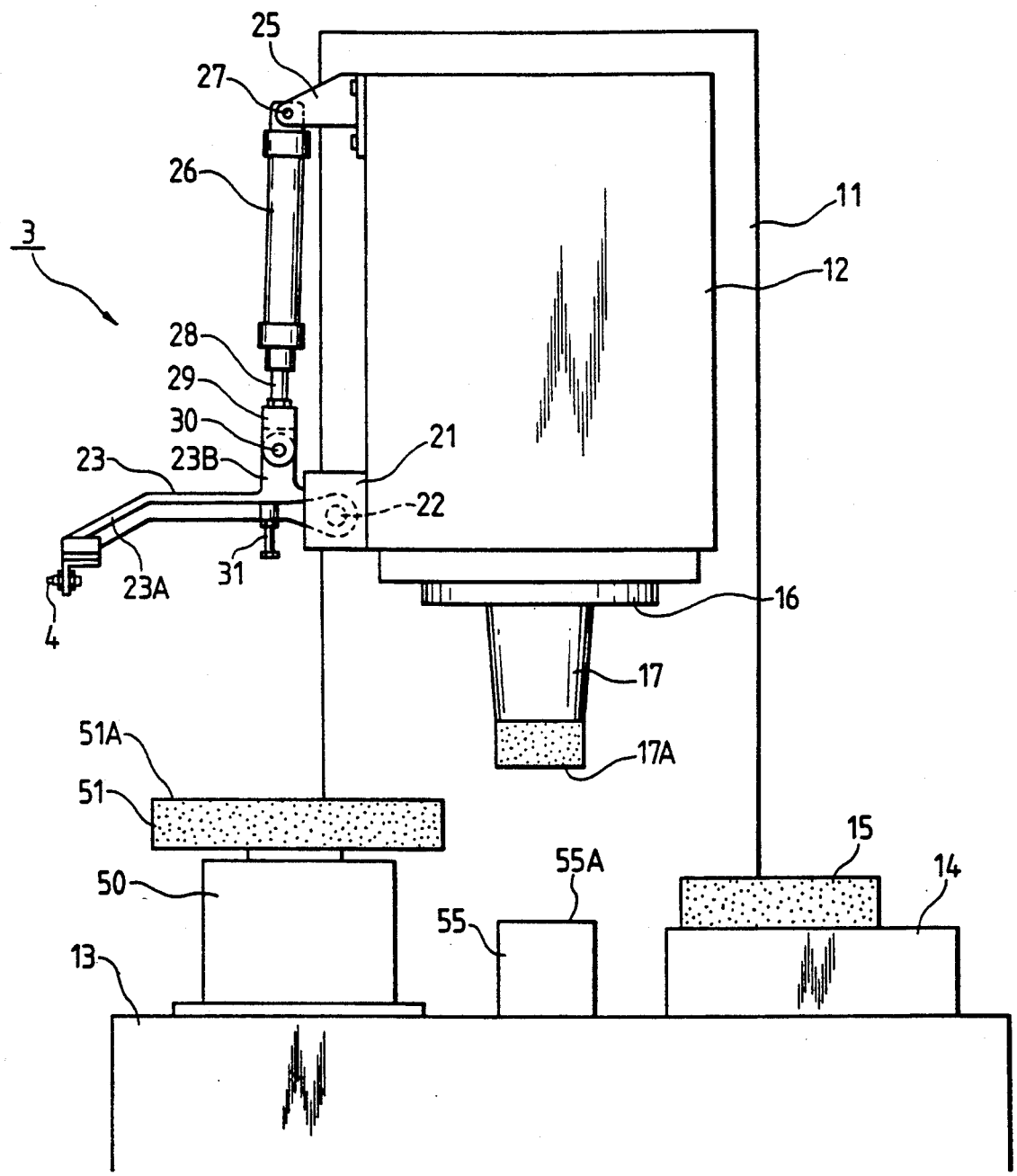
FIGS. 4A and 4B are elevational cross-sectional views showing a grinding machine according to a second embodiment of the present invention.
Figure 4B:
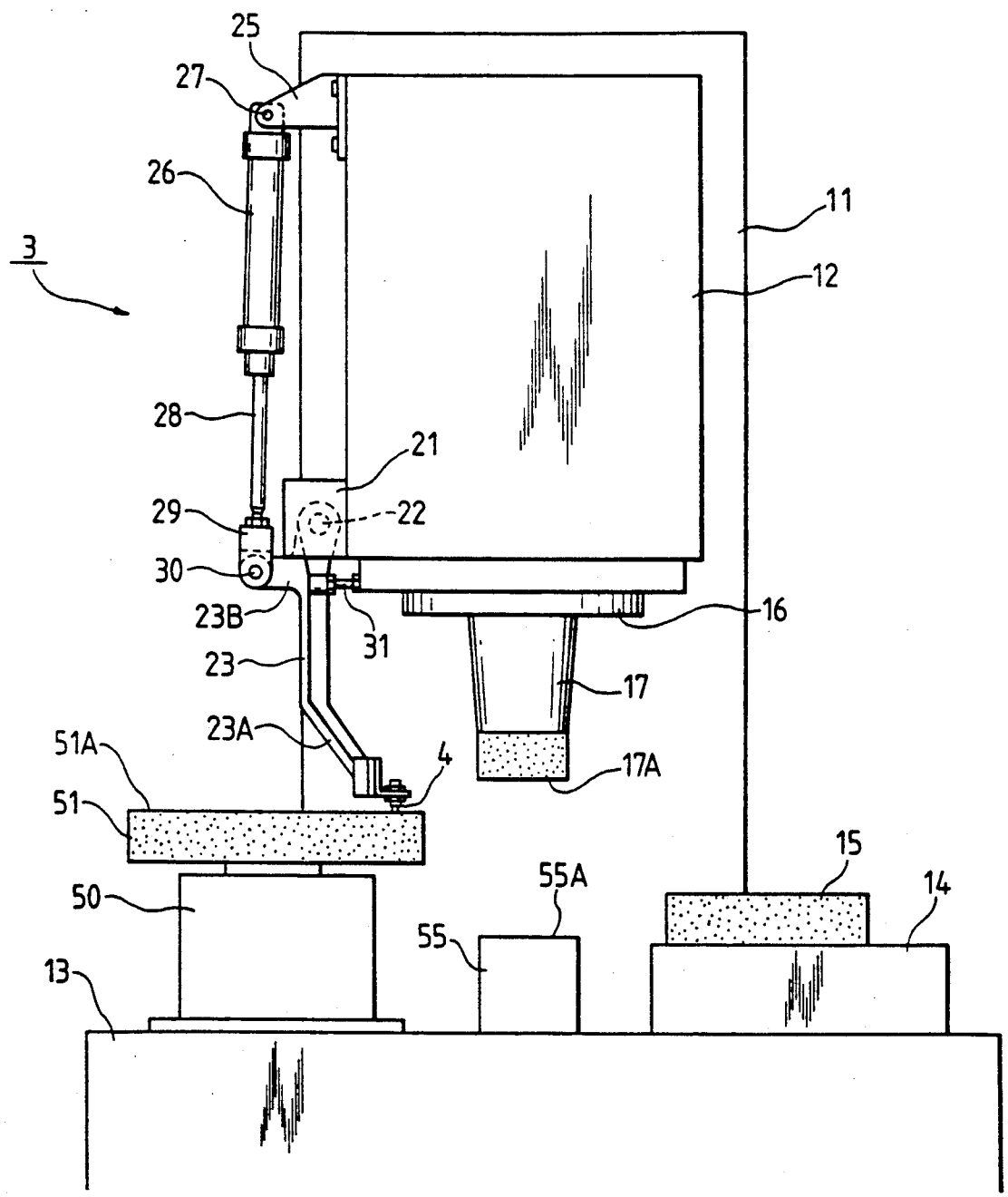

Next, a second embodiment of the present invention will be described while referring to FIGS. 4A, 4B, 5 and 7. FIGS. 4A and 4B are elevational cross-sectional views showing the second embodiment of the invention, in which the same reference numerals as shows in FIGS. 3A and 3B denote the same components or elements as those shown therein. Therefore, description thereof is omitted herein.

On the table 13, a dressing device 50 and a reference block 55 are fixedly mounted. On the dressing device 50, truing or dressing grinder 51 is mounted to be rotatable about its vertically extending axis. The top surface of the dressing 51 serves as a grinding surface 51A for truing or dressing the bottom surface 17A of the grinding tool 17 mounted on the main spindle 16. The top surface of the reference block 55 defines a reference surface 55A. When the piston rod 28 of the pneumatic cylinder 26 extends and the stopper 31 is brought into contact with the side surface of the main spindle head 12, the contact sensor 4 is in contact with the grinding surface 51A of the dressing grinder 51 or the reference surface 55A of the reference block 55. That is, in condition, the contact sensor 4 is brought to the measuring position. On the other hand, when the piston rod 28 is retracted or withdrawn, the bell crank 23 returns to the rest position where the long arm 23A extends leftwardly as shown in FIG. 4A.

Figure 5:
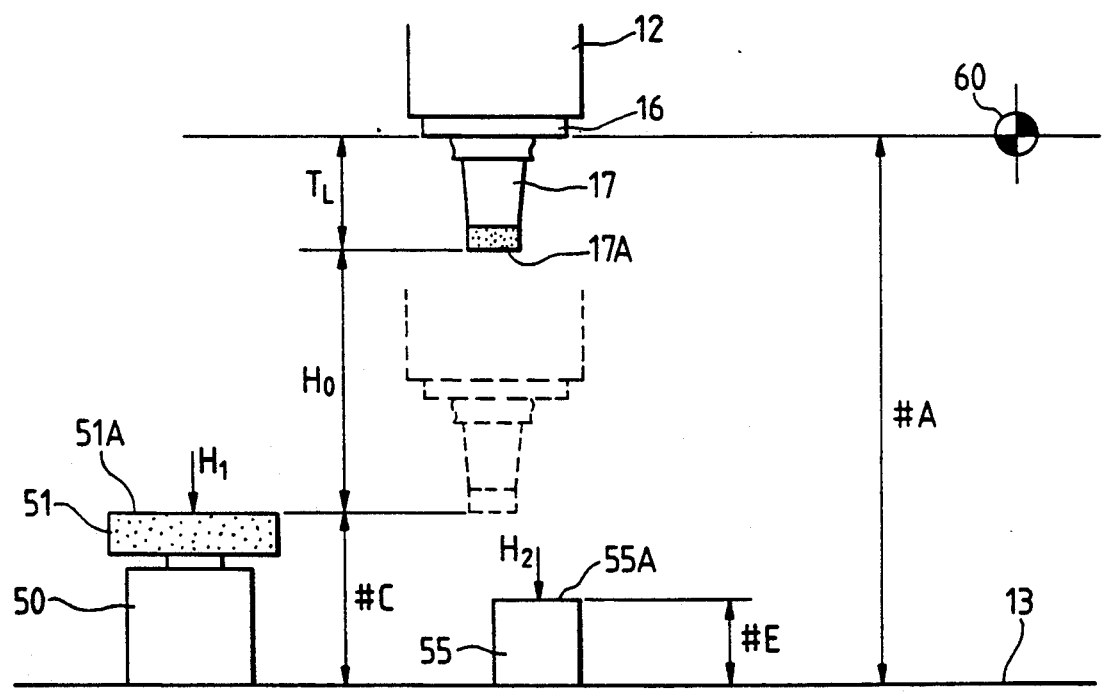
FIG. 5 is a schematical illustration diagram for description of a positional relationship between various elements under a dressing condition.

FIG. 5 shows positional relation of the various elements.

A Z-axis dimension #A is defined between a machining origin 60 and the top surface of the table 13, which value has been known in advance. The main spindle head 12 is lowered from the machining origin 60 so as to start truing or dressing of the grinding tool 17 mounted on the main spindle 16 by grinding it with the dressing grinder 51. The terminal position Ho of the main spindle head 12 is given from the feed-back data or the feeding command value stored in the NC device 1. This terminal position Ho indicates the lowermost position to which the main spindle head 12 is moved depending on the cut-depth through the dressing.

After the dressing is finished, a position H1 defined by the grinding surface 51A of the dressing grinder 51 and a position H2 defined by the reference surface 55A of the reference block 55 are measured by the measuring device 3. Although the origins of the two positions $H_1$ and $H_2$ are not identified with the machining origin 60, this is not a matter of concern. Vertical dimension #E of the reference block 55 has been known in advance.

The tool length $T_L$ of the grinding tool 17 and the reduced amount $A_1$ of the dressing grinder 51 after dressing can be calculated by using the above parameters; the terminal position Ho, the grinding surface position $H_1$, the reference surface position H2, the vertical dimension #E and the Z-axis dimension #A.

The tool length $T_L$ is calculated by the following equation;

$$TL = \#A - \{Ho + (H_2 - H_1)\} \quad \quad 1)$$

The reduced amount A1 of the dressing grinder 51 is calculated by the following equation;

$$A1 = \#C_{1-L} \{\#E + (H_2 - H_1)\} \quad \quad (2)$$

wherein $\#C_{1-L}$ represents the vertical dimension of the dressing grinder 51 before the dressing.

According to these equations the vertical dimension #C resulting from the dressing is represented by the following equation.

$$\#C = \#C_{1-L} - A1 \quad \quad (3)$$

Further, the reduced amounts A2 of the grinding tool 17 after the dressing is calculated by the following equation;

$$A2 = \{total\ cut\ depth\ value\} - A_1 \qquad (4)$$

wherein the total cut depth value is provided by the command value from the dressing program in the NC device 1.

According to the above equations Z coordinate axis at the start position for the subsequent dressing can be renewed in accordance with the following equation;

$$Start\ position = Ho + A_2 \qquad (5)$$

The cut depth value by the subsequent dressing can be maintained at a suitable predetermined value by correction the dressing program at the renewal dressing start position.

The above described truing or dressing operation, measuring operation, various calculating operations and correction of dressing program are performed under the aegis of the computer incorporated in the NC device 1.

Figure 7:
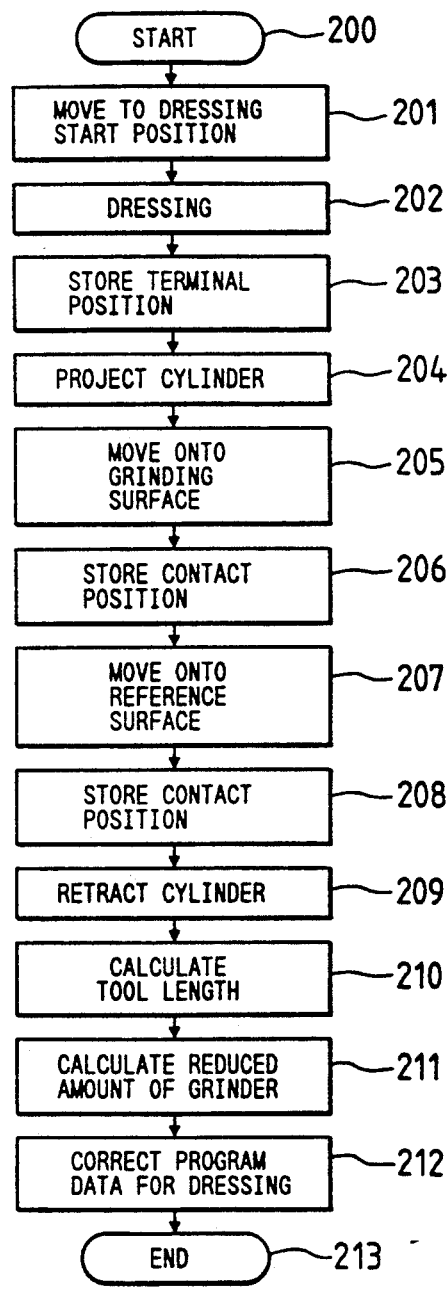
FIG. 7 is flowchart for description of the processings perfomed by a machine tool according to the second embodiment of the present invention.

FIG. 7 is a flowchart for description of the program for controlling the computer. In step 200, the processing program is started. In step 201, the grinding tool 17 is moved according to a preset truing or the dressing program to the start position for starting the truing or dressing operation. In step 202, the grinding tool 17 and the dressing grinder 51 are ground from each other to thereby perform the truing or dressing. In this stage, the pneumatic cylinder 26 has not yet been actuated and thus the contact sensor 4 is in its rest position. After the truing or dressing the program advances to step 203 where the position of the main spindle head 12 at the time when the truing or dressing has been terminated is stored as a terminal position Ho.

In step 204, the main spindle head 12 is elevated and the pneumatic cylinder 26 is actuated to project its cylinder rod 28 so that the bell crank 23 is moved into its measuring position. In step 205, the table 13 is horizontally moved and the main spindle head 12 is lowered until the contact sensor 4 outputs a contact indicative signal when the contact sensor 4 is brought into contact with the grinding surface 51A of the dressing grinder 51. In step 206, a first position H1 of the main spindle head 12, measured when the contact sensor 4 outputs the contact indicative signal, is stored.

In step 207, the main spindle head 12 is once elevated to release the contact sensor 4 from the dressing grinder 51, and the table 13 is moved and the main spindle head 12 is again lowered to bring the contact sensor 4 into contact with the top surface of the reference block 55. In step 108, a second position H2 of the main spindle head 12, measured when the contact sensor 4 outputs the contact indicative signal, is stored.

In step 209, the main spindle head 12 is elevated and the pneumatic cylinder 26 is retracted or withdrawn to have the bell crank 23 return to its rest position.

In step 210, the tool length TL is calculated by equation (1) with the position informations representing the terminal position Ho, the first and second positions $H_1$ and $H_2$ obtained in the processings performed in steps 203, 206 and 208, the previously known Z-axis dimension #A of the main spindle head 12, and the vertical dimension #E of the reference block 55. The calculated tool length TL is set into the tool correction area of the numerical control apparatus 41.

In step 211, the reduced amount $A_1$ of the dressing grinder 51 and the reduced amount $A_2$ of the grinding tool 17 are respectively calculated by equations (2) and (4) with the position informations $H_1$ and $H_2$ obtained through the processings in steps 106 and 108, the previously known dimensions #E and $\#C_{1-L}$, and the command cut-depth value programmed for the dressing.

In step 212, the vertical dimension #C of the new dressing grinder is calculated in accordance with equation (3), and the resultant value is stored. Simultaneously, start position for the subsequent dressing is calculated by equation (5). The program data for the truing or dressing is corrected in accordance with the calculated start position. After that, the program for the truing or dressing is terminated in step 213 and then a grinding work on a working will be carried out with using the tool length $T_L$ set in this program series. In the subsequent grinding work, the workpiece can be ground to a level falling within an allowable range while measuring the ground amount in accordance with the first embodiment.

As given explanation above, the grinding machine according to the second embodiment can measure the grinding surface 51A of the dressing grinder 51 and the reference surface 55A of the reference block 55 without dismounting the grinding tool 17 from the main spindle 16. Thus, a high precision tool length setting operation and a correction of the program data for the subsequent truing or dressing can be achieved. Since the series of processing steps is automatically performed, the process can be performed within an extremely short period of time without need for a skilled operator. This results in improved working efficiency.

The grinding machine constituted according to the second embodiment provides an effect such that the tool length after the truing or dressing can automatically be measured without dismounting the grinding tool from the main spindle and thus a precise tool length can be set. This effect ensures to improve machining precision and working efficiency. Further, the second aspect of this embodiment can automatically correct the program for the truing or dressing in response to the reduced amount of the grinder. This ensures that machining cycle from the dressing work to actual grinding work can automatically be repeated, thereby further improving working efficiency.

What is claimed is:

1. A grinding machine for grinding a workpiece with a grinding tool mounted on a main spindle, the main spindle being rotatably mounted on a main spindle head, comprising:

a numerical control apparatus having a function to determine a length of the grinding tool, said numerical control apparatus having a tool correcting program;

a correcting means having a working surface for dressing the grinding tool mounted on the main spindle head to correct the grinding tool and controlled by said dressing program;

a tool length measuring device for measuring the length of the grinding tool, said measuring device including a contact sensor for sensing a position and outputting a position signal representative of the sensed position;

a first storage means for storing a first position data representative of the position of the main spindle at the time when the dressing or truing by said correcting means is terminated;

a second storage means for storing a second position data representative of a second position outputted from said contact sensor when said contact sensor contacts the dressing or truing surface of said correcting means through a relative movement of said contact sensor with respect to said correcting means;

a third storage means for storing a third position data representative of a third position outputted from said contact sensor when said contact sensor contacts a reference plane through a relative movement of said contact sensor with respect to the reference plane;

a tool length calculating means for calculating the length of the grinding tool in accordance with the first position data, the second position data, and the third position data, said calculating means outputting a calculating data representative of the calculated length of the grinding tool; and a tool length determining means for determining the length of the grinding tool in accordance with the calculated data and providing a tool length data, said tool length data being used to replace a previous tool length data value in said numerical control apparatus, whereby wear of said dressing or truing grinder is automatically corrected after a dressing or a truing operation on said grinding tool.

2. A grinding machine according to claim 1, further comprising:

a reduced length calculating means responsive to the first, second and third position data for calculating a reduced length of said grinding tool through the dressing of said grinding tool; and a dressing data correcting means for correcting the dressing program in accordance with the calculated reduced length to set the dressing amount to a predetermined value.

3. A grinding machine according to claim 1, wherein said tool length measuring device comprises:

a bell crank pivotally movably supported on one side of the main spindle head, said bell crank having a first arm and a second arm;

a contact sensor fixedly secured to the first arm for sensing a position and outputting a position signal representative of the sensed position; and an actuator coupled between said second arm and said main spindle for actuating said bell crank to pivotally move said contact sensor between a first position and a second position wherein said contact sensor is capable of sensing the position when moved to the first position and is incapable of sensing the position when moved to the second position.

4. A machining tool according to claim 3, wherein said tool length measuring device further comprises a stopper attached to said bell crank, said stopper being brought in contact with the one side of said main spindle head when said contact sensor is moved to the first position for limiting the pivotal movement of said bell crank.

5. A machining tool according to claim 4, wherein said actuator urges said second arm to move said contact sensor from the second position toward the first position and said stopper limits the pivotal movement of said bell crank against the urging force.

* * * * *